May 30, 1933.　　　R. VALVERDE　　　1,911,410

METHOD OF SEALING CONTAINERS UNDER PREDETERMINED PRESSURES

Filed June 2, 1932

ROBERT VALVERDE,
INVENTOR

BY
Harold D. Penney, ATTORNEY

Patented May 30, 1933

1,911,410

UNITED STATES PATENT OFFICE

ROBERT VALVERDE, OF NEW YORK, N. Y.

METHOD OF SEALING CONTAINERS UNDER PREDETERMINED PRESSURES

Application filed June 2, 1932. Serial No. 614,921.

The present invention relates to an improvement in methods of capillarily sealing containers, or vessels, at, under or above atmospheric pressures, as the case may be.

The present invention is found useful in sealing glass tubes or bulbs of various kinds such as electric light bulbs, or radio tubes, though not so limited, but its best use has been found in finally sealing up vessels or similar structures in which electric switches are maintained, enveloped, under pressures above atmosphere, by certain gases.

The present invention is found useful in sealing pressure vessels of any material where it is not expedient to fuse the edges of the orifice together with heat because the surface tension of the fused seal would be insufficient to overcome the pressure behind it.

Unless otherwise stated I speak of pressure as absolute pressure with respect to an absolute vacuum.

A glass vessel is hereby termed a tube.

While this invention may be applied to sealing metal vessels containing a gas at any pressure, my research has shown its value in sealing tubes enclosing electric switches of various types with inert gases well above atmospheric pressures.

One type of electric switch is a bimetallic snap action thermostat, as described in my copending applications No. 394,104 and No. 496,220.

Another type of electric switch is the hard glass mercury tube switch.

It is known that the arc quenching ability of a gas materially improves as it departs in either direction from one pressure, characteristic of each gas.

Glass has proven its value in producing gas tight seals for enclosed electrical devices where fractional millimeter pressures are concerned. But, except for a few gases, it has not been practical to seal a glass tube containing gas under high pressure.

With the present invention I have been able to exploit the arc quenching ability of gases under a pressure of several atmospheres and have thereby materially increased the capacity of these switches.

Hence an object of this invention is to provide a method for sealing such tubes with the operating structure assembled therein, whereby any desired pressure may be created therein and perfectly maintained.

Another object is to provide a method for sealing any vessel, which does not become plastic like glass, whereby a pressure may be created therein and perfectly maintained.

In accordance with the above this invention comprises mainly in the provision, first, of a capillary duct in the tube; second, of a cement which will wet and be drawn into the capillary duct to subsequently harden therein and thereby seal the duct; and third, of a method of treating this cement so that it will not seal the duct until after a specified pressure has been created in the tube.

Figure 1:
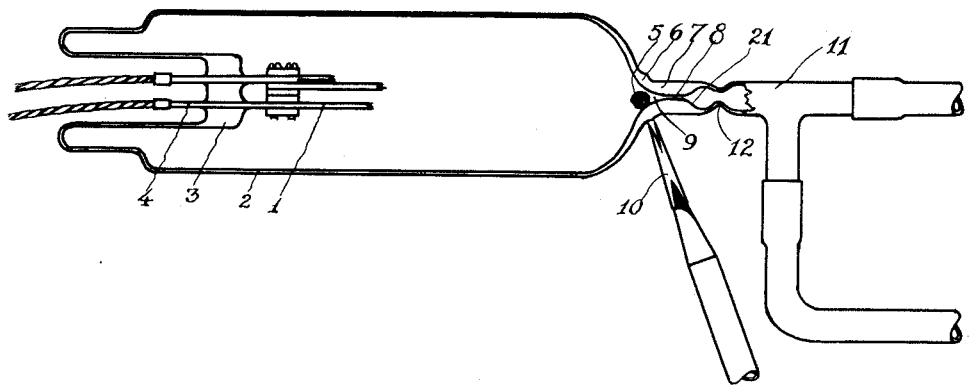
Fig. 1 shows a tube containing an electric switch, showing, in a partial sectional view, means for attaching and for creating pressure in said tube with the ensealing pellet in position to be melted, with means for melting said pellet.

In my practice, in suppressing 30 ampere direct current arcs I seal a bimetallic snap action switch 1, fragmentarily shown, in a tube 2, as in Fig. 1, wherein the switch is mounted on a hard glass stem 3 by the tungsten leads 4 to form a gas tight seal.

In my first method, when the tube 2 has cooled, a small hard pellet 5 of heat plastic cement is dropped into the tube by way of the orifice 6 left when the glass blower's tube is cut free. Keeping the pellet 5 in the cool part of the tube 2 near the stem 3 the glass blower fuses a glass capillary stem 7 to this orifice 6. The capillary stem 7 is first made by drawing and working a small diameter tube until a long orifice 8 with a diameter of about .005 of an inch is formed.

When the tube 2 is cool the pellet 5 is rolled into the tapered mouth 9 of the capillary 7 and caused to stick there without completely melting it, to temporarily locate it, by heating the capillary slightly with a flame 10. The pellet 5 does not seal the capillary duct 8 at this time.

The tube 2 is evacuated and filled with hydrogen or other electrically inert gas through the two-way stem 11. When the specified pressure is obtained within the tube 2 it is then held and the soft flame 10 is then played on the capillary stem 7. The pellet melts as in Fig. 2 and spreads to the capillary duct 8, whereupon it is drawn into the duct by capillary action, no matter in what position the tube happens to be.

By adjusting the pressure differential between the tube 2 and the stem 11 the fluid pellet of cement can be caused to gather at either end of the capillary. This permits a variation by introducing the pellet 5 from the stem end 11 of Fig. 1, and temporarily sticking it to the capillary mouth 21.

After the specified tube pressure is obtained, the pellet in the capillary mouth 21 is melted by the flame 10 and runs into the capillary to seal it as before described.

Depending on the viscosity of the cement and the diameter of the capillary duct the pressure in stem 11 may be reduced to atmospheric pressure before the seal hardens.

A second method of sealing the capillary duct 8 is to employ a liquid cement which hardens with or without the use of heat. The cement is poured into a somewhat larger capillary duct and a specified pressure created in the tube 2. The cement will be forced out of the capillary duct 8 and into either mouth 9 or mouth 21. When the flow of gas through the capillary 8 ceases the cement promptly fills the duct once more and hardens therein to seal the tube. I contemplate obvious combinations of these two methods utilizing the characteristics of the capillary duct.

The tube is subsequently freed from the filling stem 11 at the neck 12 by fusing it off with a hard flame or merely cutting it free.

The pellet or sealing material must become a fluid at a temperature below that at which the tube 2 or capillary stem 7 becomes plastic.

I use a pellet of resinous material which melts at a temperature higher than the operating temperature of the tube. It wets the glass and, when hardened, adheres well enough to maintain a high vacuum for several weeks. As a high pressure seal it lasts indefinitely.

Figure 3:
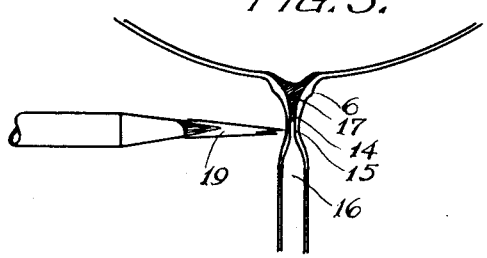
Fig. 3 is a modification of the capillary stem wherein the cement ensealment permits a subsequent fused glass seal.
Figure 4:
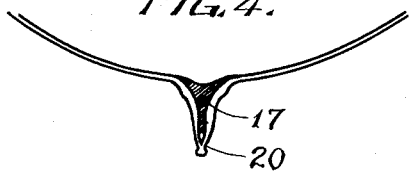
Fig. 4 shows the fused glass seal-off, as a further step of completing the closure partly shown in Fig. 3.

By the use of cements which set slowly to form a seal not affected by heat a fused glass seal-off can be obtained by the following third method.—In Fig. 3 the capillary stem 14 is so formed to produce thin walls at the capillary duct 15 before widening out into the filling stem 16. The cement in powder form, held together by a binder into a pellet, is attached to the mouth 17 of the capillary. After the gas is introduced under pressure into the tube 18 the flame 19 melts the cement. By suitably controlling the pressure differential the cement is prevented from wetting the thin walled section of the capillary duct. When the cement sets the flame is hardened and the thin walled part of the capillary is quickly fused before sufficient gas passes the cement to blow up the glass seal. The result is a perfect glass seal 20 independent of the temporary cement seal 17 as shown in Fig. 4.

Figure 2:
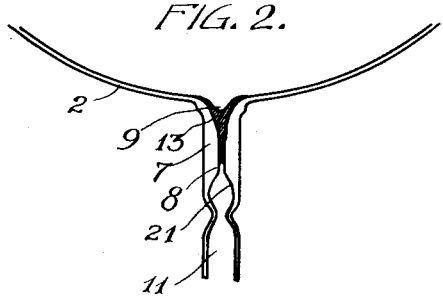
Fig. 2 is a fragmentary view of a similar glass tube enlarged, showing the form of the final ensealment.

In Fig. 2 I divide the capillary stem portion of the tube 2, into three sections, the long taper mouth 9, the capillary duct 8, and the short taper mouth 21.

It has been found that with the capillary duct filled with molten cement 13, a greater pressure is required to force the cement out of the long taper mouth 9 and into the short taper mouth 21 than is required to reverse the flow. Where very fine capillary ducts are employed, on the order of .003 of an inch diameter or less, the viscosity of the molten resinous cement was found to be sufficiently high to neutralize any pressure below the bursting pressure of the tube. The employment of a capillary stem 7 formed as in Fig. 2 materially aided this characteristic of the capillary.

Should the vessel be other than glass the same general sealing methods apply. The use of a metallic solder for the pellet 5 would be preferred for metallic vessels.

Owing to the manner of sealing the capillary duct 8 with a heat plastic cementitious material, it is possible, when necessary, to break the seal by heating the cement in situ, and then introducing a small diameter wire into the capillary 8, forcing out the cement and breaking it up. The wire, kept in motion, may be withdrawn when cool, leaving the capillary duct 8 open once more.

It will be apprehended that I have not only created a new method of sealing vessels under pressure in a simple manner, by taking advantage of the characteristics of a capillary duct but I have produced an article of manufacture which is perfect in its operation and faultless in its holding of pressures through the prevention of leakage.

What I claim is:

1. A method of sealing a vessel having an open capillary duct consisting in providing said vessel with a meltable non-plastic cement, creating desired pressures within said vessel through said duct and then heating said cement to the plastic stage to cause it to flow into, harden, and seal said duct.

2. A method of sealing a vessel having an open capillary duct consisting in providing said vessel with a meltable non-plastic cement, creating desired pressures within said vessel through said duct and then heating said cement at a low temperature to cause it to flow into, harden, and seal said duct.

3. A method of sealing a vessel having an open capillary duct consisting in providing said vessel with a meltable, normally non-plastic cement, creating desired pressures within said vessel through said duct, holding the pressure within said vessel and then heating said cement at a low temperature to cause it to flow into and seal said duct.

4. A method of sealing a vessel under pressure consisting in providing a closed vessel with a single open capillary duct, said vessel having therein a heat plastic cement, then creating a desired pressure in said vessel through said duct, and then melting said cement to cause the same to seal said duct.

5. A method of sealing a vessel under pressure consisting in providing a closed vessel having a neck portion with an open capillary duct therein, said vessel having therein a heat plastic cement, then creating a pressure in said vessel through said duct, then heating said neck portion to melt said cement to cause the same to enter said duct, and then cooling the neck portion, to harden the cement to seal said duct.

6. A method of sealing a vessel having an open capillary duct consisting in providing said vessel with a cement, creating a pressure within said vessel through said duct and then heating said cement to cause it to melt and flow into and seal said duct.

7. A method of imparting a gas tight seal to a vessel having a capillary duct consisting in providing said vessel with a dry cement, whose melting point is below the softening point of the vessel, melting said cement to cause it to wet and be drawn into said duct, and harden in situ.

8. A method of imparting a gas tight seal to a vessel having a capillary duct consisting in providing either entrance of said duct with a dry cement, creating a pressure within said vessel through said duct, holding said pressure while said cement is caused to melt and wet said duct and be drawn into said duct by capillary action, then releasing said pressure outside of said vessel when said cement has hardened.

9. A method of imparting a gas tight seal to a vessel having a capillary duct consisting in filling said duct with a liquid cement, creating a specified pressure in said vessel whereby the cement is forced out of and adjacent to said duct and holding said pressure on both sides of said duct until said liquid cement is drawn by capillary action back into said duct to harden therein.

10. A method of imparting a gas tight seal to a vessel having a fine capillary stem of low heat conductivity consisting in providing said vessel with a cement, creating a pressure within said vessel through the capillary duct of said stem, causing said cement to melt and wet part of said duct, adjusting said pressure to permit said cement to be drawn by capillary action into and harden in, one part of said stem and then fusing the other part of said stem together to close said duct.

11. As a new article of manufacture, a vessel having a desired gaseous pressure therein, said vessel having a stem with a capillary duct therein for the admission of said pressures therein and a capillary seal in said duct.

12. As a new article of manufacture, a tube having electro-responsive elements sealed therein under desired gaseous pressures, said tube having a stem with a capillary duct therein, said duct having one end of greater taper than the other end.

13. As a new article of manufacture, a tube having electro-responsive elements therein under predetermined gaseous pressures, said tube having a capillary duct therein for the admission of said predetermined pressures therein and a capillary seal in said duct.

14. As a new article of manufacture, a tube having electro-responsive elements therein under predetermined gaseous pressures, said tube having a neck portion with a capillary duct therein for the admission of said predetermined pressures therein and a low temperature capillary seal in said duct.

15. As a new article of manufacture, a tube having electro-responsive elements therein under gaseous pressures above atmospheric pressure, said tube having a capillary duct for the admission of said pressures therein and a capillary seal in said duct.

16. As a new article of manufacture, a tube having other than electro-responsive elements therein under predetermined gaseous pressures, said tube having a capillary duct for the admission of said predetermined pressures therein, and a seal in said duct.

Signed at New York in the county of New York and State of New York this 1st day of June A. D. 1932.

ROBERT VALVERDE.